April 25, 1933.  J. W. SIMMONS  1,906,187
SPEED INDICATING DEVICE
Filed Feb. 6, 1930
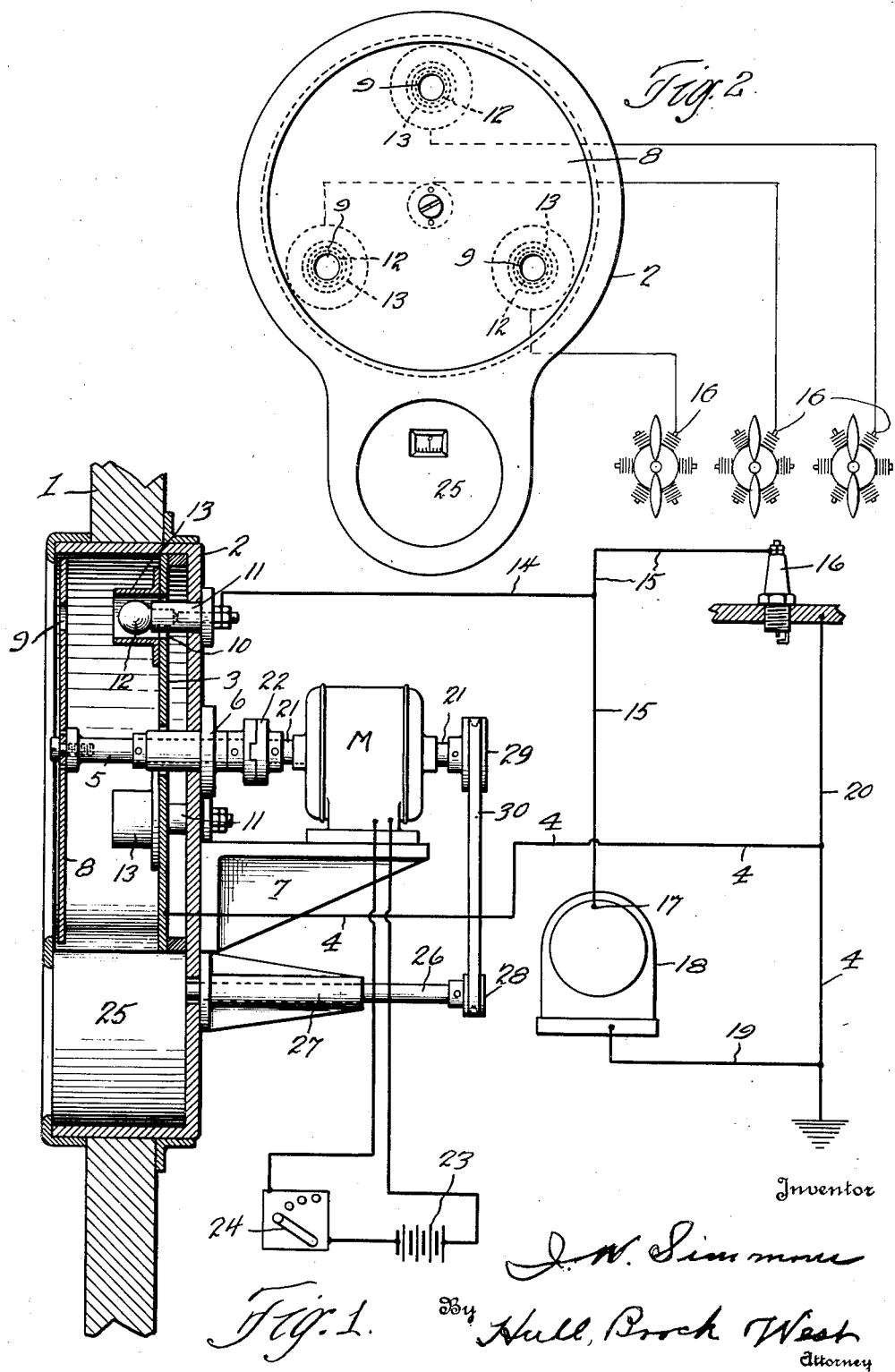

Patented Apr. 25, 1933

1,906,187

UNITED STATES PATENT OFFICE

JOHN W. SIMMONS, OF CLEVELAND, OHIO, ASSIGNOR TO PIONEER INSTRUMENT COMPANY, INCORPORATED, OF BROOKLYN, NEW YORK, A CORPORATION OF NEW YORK

SPEED INDICATING DEVICE

Application filed February 6, 1930. Serial No. 426,315.

This invention relates to a tachometer or indicating device for indicating the speed at which one or more motors are operating and is of general application although the embodiment of the invention herein illustrated is particularly adapted for use in connection with synchronizing the speed of a plurality of motors of a multi-motored aeroplane.

The main object of the invention is to provide an indicator for indicating the actual speed as well as the relative speed at which a plurality of motors are operating.

A further object of the invention is to provide an indicating device of the character described which is simple in construction, efficient and dependable in operation and which comprises relatively few parts which will occupy a minimum of space and can be readily assembled and disassembled.

At present the outboard motors of a multi-motored aeroplane are provided with a tachometer which is arranged on the side of the motor adjacent the cockpit so as to be visible to the pilot. This arrangement is not practical due to the fact that the dials are often obscured by oil from the motor, or in stormy weather, by ice or water, thereby rendering the same useless. At night no means of illumination is available so the dial can be seen at all and the pilot is forced to estimate the speed of the outboard motors. One of the objects of this invention is to provide a speed indicating device which will eliminate this difficulty and which can be arranged within the cockpit of the aeroplane so as to be at all times visible to the pilot.

Another object of the invention is to provide an indicator of the character described which can be arranged within the cockpit of an aeroplane and which will enable the pilot to determine the speed, that is, the R. P. M., of any one or all of the motors and also to determine whether the motors are operating in synchronism.

In devices of this character, it is not practical to make use of the ordinary form of chain or cable drive, such as is used on speedometers of automobiles, due to the fact that the length of the chain or cable is such that it is likely to become broken or disconnected and cause considerable damage to the aeroplane or its controls, and possibly force the aeroplane down out of control. My device eliminates these difficulties as there is only a single wire leading from the cockpit to each of the motors and is of such nature that the pilot may at all times ascertain the R. P. M. at which any one or all of the several motors are operating.

The device as a whole embodies comparatively few parts which may be arranged within a suitable casing and secured to the instrument panel in the cockpit of an aeroplane.

Further and more limited objects of the invention will appear as the description proceeds and by reference to the accompanying drawing in which Fig. 1 is a central vertical sectional view together with a diagrammatic disclosure of the wiring necessary and Fig. 2 is a view in front elevation and diagrammatically showing the device connected to a plurality of aircraft engines.

Referring now to the drawing, the reference character 1 designates the instrument panel which is positioned within the cockpit. Secured to the instrument panel 1 is a casing 2 in which the indicator mechanism is arranged. Fitting within the casing 1 is a stationary panel 3 which is preferably formed of some suitable conducting material and is grounded on the frame of the aeroplane by means of a wire 4. The panel 3 is provided with a centrally disposed opening through which extends a shaft 5 which is journaled in a suitable bearing 6. One end of the shaft is connected with and is driven from an electric motor M which is preferably supported upon a bracket 7 secured on the rear face of the casing 2. Non-rotatably secured on the outer end of the shaft 5 is a disk 8 having a plurality of equi-spaced openings 9 therein and which is formed of paper, metal or some other suitable material. Carried by the casing 2 are a plurality of insulating sockets or plugs 11 which project into the openings 10 and are adapted to receive therein gas illuminated tubes 12 which are preferably of the neon type. The tubes 12 project through the openings 10 and are surrounded by annular collars or sleeves 13 which are secured to the panel 3 in any suitable manner. The collars or sleeves 13 project outwardly from the face of the panel 3 and serve a double purpose, first, to confine or concentrate the light flashes so that the flashes will be visible only immediately in front of the panel and, second, to provide exterior electrodes for the tubes. Leading from each of the sockets 11 is a wire 14 which connects with a wire 15 one end of which connects with the spark plug 16 of the motor and the other end of which connects with a contact 17 of the magneto 18 which is grounded by a wire 14 which connects with the wire 4.

The shaft 5 is non-rotatably connected with the shaft 21 of the motor M by means of a coupling 22. The motor M is a variable speed electric motor which is driven from a battery 23 and which is controlled by a controller 24. Arranged within the casing 2 is a speedometer 25 from which leads a shaft 26 which is journaled in a suitable bearing 27. The shaft 26 of the speedometer is driven from the shaft 21 of the motor through the medium of pulleys 28 and 29 and belt 30 although any other suitable driving connection may be provided.

Assuming that the device is to be used in connection with a three-motor aeroplane, the grids of each of the tubes are connected in circuit with one of the spark plugs of the motors respectively, as shown diagrammatically in Fig. 2. When the motors are started, the electrodes of the several tubes become incandescent and the tubes are rendered luminous at predetermined intervals depending upon the speed at which the respective motors are operating. In other words, each of the tubes is energized in direct ratio to the speed of the motor to which it is connected. For example, if the motors are four-cycle motors, each of the tubes will be rendered luminous every second revolution of the motor. As the disk 8 is non-rotatably connected with the shaft 5, it will be clear that when the motors are operating in synchronism with the electric motor M, the flashes will occur when the openings 9 are opposite the tubes 12. If all of the motors are operating in synchronism, the lights will be seen through the openings 9 and will appear stationary. Should one of the motors be operating at a slower speed than the shaft 5, the light flashes will appear to move clockwise and if the motor is operating faster than the shaft 5, the light flashes for that motor will appear to move counter clockwise.

It will therefore be clear that it is a relatively simple matter for the pilot to speed up or slow down the motors until all of the lights appear stationary whereupon he will be assured that they are operating in synchronism. It will therefore be apparent that the pilot may operate all of the motors at the same speeds or at different speeds. The dial of the speedometer 25 is calibrated in terms of R. P. M. and indicates the true speed at which the motors are operating. The pilot may adjust the speed of the motors until they are all operating in synchronism and then glance at the speedometer and ascertain the actual speed of the motors. The motor M is preferably a variable speed electric motor and should the pilot desire to know the speed at which any one of the motors is operating, he may adjust the speed of the motor M until the light flash for that particular motor appears stationary. He may then glance at the speedometer and ascertain the actual speed at which that motor is operating.

It will now be clear that I have provided a tachometer or indicating device by means of which a pilot may determine the actual speed of any one or all of a plurality of motors and also determine whether the motors are operating in synchronism.

The position of the disk 8 on the shaft 5 may be adjusted so that the openings 9 in the disk will be out of alignment with the tubes when the same are rendered luminous. In this case, when the motors are all operating in synchronism, none of the light flashes will be visible. However, should one of the motors become out of synchronism the light flashes of that particular motor will become visible. It will therefore be apparent that it requires no change other than the setting of the disk in a slightly different position on the shaft 5 to operate the device in this manner. The disk is preferably black over its entire surface and no light will show through the openings until one of the motors becomes out of synchronism. Should one light become visible through the openings, the speed of that motor may be increased or decreased until the flash is no longer visible. The openings 9 in the disk are only of sufficient size to enable the pilot to see the flashes and, if desired, different colored lights may be used for the different motors.

In order to adapt the device for use with an aeroplane having four or more motors, it is only necessary to provide a corresponding number of tubes and a disk or panel having a corresponding number of openings.

It will be seen that by making use of the sleeves or collars 13, which are grounded on the frame, it is necessary to have only one wire leading from the indicator to each motor. The sleeves, being grounded on the frame, provide capacity coupled electrodes for the tubes which are not directly in circuit with the ignition systems of the motor.

It will also be understood that two methods of producing illumination are available. The internal electrodes of the tube may, if desired, be connected in series, between the magneto and the spark plug in which case a much more brilliant illumination is obtained, or the tubes may be energized by the capacity external electrode arrangement in which case the illumination is not quite so brilliant.

It will now be clear that I have provided an indicating device which will accomplish the objects of the invention as hereinbefore stated. The embodiment of the invention herein disclosed is merely illustrative and is not to be considered in a limiting sense, as various changes may be made in the details of construction and in the manner of connecting the several parts without departing from the spirit of my invention. For example, it is entirely practicable to rotate the panel 3 containing the tubes and hold the disk 8 stationary. For example, it is entirely practicable to mount the tubes on the panel 3. If desired, the neon tubes may be attached to the face of the revolving dial and may be in the same or different colors. In this instance, the tubes should be somewhat pencil shaped with an electrode on each end or only on one end as circumstances warrant. While I have illustrated an electric motor for driving the disk 9, it is obvious that it may be driven by any suitable means. It is only necessary that either the dial or the panel containing the lights be rotated and that some means be provided for determining the speed of rotation. It will therefore be understood that my invention is limited only in accordance with the scope of the appended claims.

Having thus described my invention, what I claim is:

1. An indicator for indicating the speed of an internal combustion motor and comprising a dial having an aperture therein, an electric lamp disposed adjacent said dial, so that it may be viewed through the aperture, means for causing a relative movement between said dial and lamp, means connecting said lamp with said combustion motor in such a manner that said lamp will be energized periodically in accordance with the speed of said motor, and means operatively associated with said dial for indicating the rate of relative movement between said dial and said lamp and from which the speed of the motor is determined.

2. An indicator for indicating the synchronism and the actual speeds of a plurality of combustion motors and comprising a dial having a plurality of openings therein, a plurality of electric lamps disposed behind said openings respectively, means for connecting each of said lamps with each of said combustion motors respectively, whereby said lamps will be periodically energized in proportion to the speed of said motors respectively, means for causing a relative movement between said lamps and dial, and means for indicating the rate of said movement from which the speed of any one or all of said combustion motors is determined.

3. An indicator for determining the relative and actual speeds of a plurality of motors and comprising a dial having a plurality of openings therein, a plurality of gas illuminated tubes disposed behind said openings respectively and connected with the ignition systems of said motors respectively so as to be energized periodically in proportion to the speed of said motors, means for rotating said dial at variable speeds so that said illuminated tubes appear to be stationary when the motors are operating in synchronism with each other but appear to be moving in one direction or another when said motors are not in synchronism, and means driven by said last named means for indicating the speed of rotation of said dial from which indication the actual speeds of said motors are determined.

4. An indicator for multi-motor aeroplanes arranged for mounting on an instrument panel thereof so as to be visible to the pilot of the aeroplane and adapted to indicate the actual speeds of said motors and also when the motors are operating in synchronism, said indicator comprising a rotatably mounted dial having an aperture for each motor, a similar number of gas illuminated tubes as there are apertures in the dial and disposed behind said dial and electrically connected with the ignition systems of said motors respectively, whereby said tubes will be energized intermittently in direct ratio to the speed of said motors respectively, means for rotating said dial at variable speeds so that said illuminated tubes appear to be stationary when the motors are operating in synchronism with each other but appear to be moving in one direction or another when said motors are not in synchronism, and means for indicating the speed of rotation of said dial from which indication the actual speeds of said motors are determined.

5. In combination with a plurality of motors of an aeroplane, an indicator for indicating the actual speeds of said motors respectively as well as for indicating when said motors are operating in synchronism and comprising a rotatably mounted dial having openings therein, a plurality of gas illuminated lamps disposed behind said dial and visible through said openings under predetermined conditions, said lamps being connected in an electrical circuit with the ignition systems of said motors respectively, means for rotating said dial so that said illuminating lamps appear to be stationary when the motors are operating in synchronism with each other, but appear to be moving in one direction or another when said motors are not in synchronism, means for synchronizing the speed of the dial with the speed of any one or all of said motors, and means for indicating the speed of rotation of said dial from which indication the actual speeds of said motors are determined.

In testimony whereof, I hereunto affix my signature.

JOHN W. SIMMONS.